(12) United States Patent
Maiwald et al.

(10) Patent No.: US 6,841,893 B2
(45) Date of Patent: Jan. 11, 2005

(54) HYDROGEN PRODUCTION FROM HYDRO POWER

(75) Inventors: Marco Maiwald, Heidenheim (DE); Bertram Kurt Müller, Heidenheim (DE)

(73) Assignees: Voith Siemens Hydro Power Generation, GmbH & Co. KG, Heidenheim (DE); Voith Siemens Hydro Power Generation, Inc., York, PA (US)

( * ) Notice: Subject to any disclaimer, the term of this patent is extended or adjusted under 35 U.S.C. 154(b) by 0 days.

(21) Appl. No.: 10/861,688

(22) Filed: Jun. 4, 2004

(65) Prior Publication Data

US 2004/0220701 A1 Nov. 4, 2004

Related U.S. Application Data

(62) Division of application No. 10/265,886, filed on Oct. 7, 2002.

(51) Int. Cl.[7] ............................................. H02P 9/04
(52) U.S. Cl. ........................ 290/43; 290/1 R; 700/291
(58) Field of Search .......................... 290/1 R, 43, 44, 290/54; 700/291, 273; 60/398

(56) References Cited

U.S. PATENT DOCUMENTS

| | | | |
|---|---|---|---|
| 3,923,417 A | 12/1975 | Swiecicki | 415/110 |
| 4,024,912 A | 5/1977 | Hamrick et al. | 166/57 |
| 4,053,576 A | 10/1977 | Fletcher | 423/579 |
| 4,080,271 A | 3/1978 | Brown | 204/98 |
| 4,087,976 A | 5/1978 | Morrow, Jr. et al. | 60/643 |
| 4,184,084 A | 1/1980 | Crehore | 290/55 |
| 4,228,361 A | 10/1980 | Jacobs et al. | 290/44 |
| 4,228,362 A | 10/1980 | Jacobs et al. | 290/44 |
| 4,233,127 A | 11/1980 | Monahan | 204/157.1 R |

(List continued on next page.)

FOREIGN PATENT DOCUMENTS

| | | |
|---|---|---|
| EP | 1183463 | 6/2002 |
| GB | 1519947 | 8/1978 |
| GB | 1 518 234 | 7/1998 |

*Primary Examiner*—Nicholas Ponomarenko
(74) *Attorney, Agent, or Firm*—Foley & Lardner LLP

(57) ABSTRACT

A method is provided for operating a hydroelectric power generating facility configured for operating in first and second operating modes. The facility includes a turbine driven power generating unit receiving a flow of water through an upstream conduit to generate electrical power. The method comprises computing a first economic value for the generated electrical power when operating in the first operating mode, and computing a second economic value for the generated electrical power when operating in the second operating mode. The method further comprises comparing the first economic value with the second economic value to identify the operating mode that provides the higher economic value, and operating the turbine facility in the identified operating mode.

38 Claims, 4 Drawing Sheets

U.S. PATENT DOCUMENTS

| | | | |
|---|---|---|---|
| 4,246,080 A | 1/1981 | Shinn | 204/129 |
| 4,284,899 A | 8/1981 | Bendiks | 290/1 R |
| 4,311,011 A | 1/1982 | Lewis | 60/641.15 |
| 4,335,093 A | 6/1982 | Salomon | 423/644 |
| 4,384,212 A | 5/1983 | Lapeyre | 290/53 |
| 4,388,533 A | 6/1983 | Campbell et al. | 290/1 R |
| 4,462,213 A | 7/1984 | Lewis | 60/641.8 |
| 4,468,167 A | 8/1984 | Ogiwara et al. | 415/1 |
| 4,490,232 A | 12/1984 | Lapeyre | 204/278 |
| 4,565,617 A | 1/1986 | Ahuja | 204/229 |
| 4,586,334 A | 5/1986 | Nilsson, Sr. et al. | 60/524 |
| 4,883,823 A | 11/1989 | Perry, Jr. et al. | 518/702 |
| 4,896,507 A | 1/1990 | Hosford | 60/641.8 |
| 4,898,512 A | 2/1990 | Geffs | 415/1 |
| 4,910,963 A | 3/1990 | Vanzo | 60/641.8 |
| 4,993,348 A | 2/1991 | Wald | 114/265 |
| 5,512,787 A | 4/1996 | Dederick | 290/4 R |
| 5,537,963 A | 7/1996 | Hasebe et al. | 123/90.16 |
| 5,592,028 A | 1/1997 | Pritchard | 290/55 |
| 5,658,448 A | 8/1997 | Lasich | 205/628 |
| 5,795,666 A | 8/1998 | Johnssen | 429/17 |
| 5,843,297 A | 12/1998 | Schmid et al. | 205/687 |
| 5,852,927 A | 12/1998 | Cohn et al. | 60/39.05 |
| 5,900,330 A | 5/1999 | Kagatani | 429/17 |
| 5,953,227 A * | 9/1999 | March et al. | 700/36 |
| 6,015,041 A | 1/2000 | Heung | 206/0.7 |
| 6,051,892 A * | 4/2000 | Toal, Sr. | 290/43 |
| 6,104,097 A | 8/2000 | Lehoczky | 290/54 |
| 6,211,643 B1 | 4/2001 | Kagatani | 320/101 |
| 6,217,728 B1 | 4/2001 | Lehmann et al. | 204/265 |
| 6,223,532 B1 | 5/2001 | Brassea-Flores | 60/495 |
| 6,269,287 B1 * | 7/2001 | March | 700/287 |
| 6,274,093 B1 | 8/2001 | Long et al. | 422/129 |
| 6,282,774 B1 | 9/2001 | Borucinski et al. | 29/592.1 |
| 6,294,142 B1 | 9/2001 | Nazri | 423/275 |
| 6,299,744 B1 | 10/2001 | Narayanan et al. | 204/263 |
| 6,314,732 B1 | 11/2001 | Lookholder | 60/597 |
| 6,348,278 B1 | 2/2002 | LaPierre et al. | 429/17 |
| 6,490,506 B1 * | 12/2002 | March | 700/286 |
| 6,670,721 B2 * | 12/2003 | Lof et al. | 290/44 |
| 6,681,156 B1 * | 1/2004 | Weiss | 700/291 |
| 6,745,105 B1 * | 6/2004 | Fairlie et al. | 700/273 |
| 6,745,109 B2 * | 6/2004 | Kojima et al. | 700/291 |

* cited by examiner

HYDROGEN PRODUCTION FROM HYDRO POWER

CROSS-REFERENCE TO RELATED APPLICATIONS

This is a divisional application of co-pending U.S. patent application Ser. No. 10/265,886, filed Oct. 7, 2002.

FIELD OF THE INVENTION

The present invention relates to the field of hydrogen production from hydroelectric power. More particularly, the invention relates to the high volume production of hydrogen from large scale hydroelectric power dam installations. The invention further relates to a technique for performing an economic analysis to determine when to operate the hydroelectric power dam installation in a hydrogen production mode.

BACKGROUND OF THE INVENTION

Most energy produced today is derived from fossil fuels such as oil, coal and natural gas. However, these energy sources all have significant disadvantages including pollution, periodic shortages and escalating costs of extracting the fuels. Although at one time it was thought that nuclear fission power could provide an answer to these problems, that has not proved out. Not only are there significant concerns regarding the safety of operating the existing nuclear systems, but there is also the significant problem of the safe transportation and long term storage of the spent fuel.

By contrast, solar, wind and hydro energy systems all offer the advantages of being relatively safe and reliable. Moreover, these technologies have the common advantage of drawing their power from sources that are virtually inexhaustible. However, that is not to say these technologies are without difficulties. For example, one difficulty with these technologies is that the underlying energy sources (i.e., wind, sunlight and water) can be subject to periodic swings in availability, e.g., the sun may eclipse, the winds may subside, and the water levels may fall due to extended periods of drought. Another difficulty is that the best locations for capturing the foregoing energy sources are often remote from where the energy is used. This is especially the case for large scale hydro power installations.

Traditionally, most wind, solar and hydro power installations (particularly large scale, commercial operations) rely on utility grids for transferring the generated energy to where it will be used. However, this may not be the most efficient use of the generated energy from an economic standpoint. As is well known, connecting a wind or hydro powered turbine generator to a utility grid imposes certain constraints on the generator. For example, the power output of the generator must be synchronized (i.e., in phase) with the utility's grid supply. With synchronized generators, this is accomplished by controlling the rotor speed of the turbine to exactly match the utility supply frequency. Another constraint with relying solely on a utility grid as a carrier of the generated energy is that there may be a low demand on the grid at the same time there is ample capacity to generate additional power. When this occurs, the energy that could be captured is simply wasted. Although various energy storage systems (e.g., battery storage or pumped hydro-energy storage) can be utilized to overcome this problem, such systems are relatively expensive to install and result in efficiency losses of their own due to the repeated energy conversions.

Although most large scale solar, wind and hydro generating installations rely solely on utility grids for transporting the energy to where it is used, some installations use other means. In particular, it is known to use the electrical energy from solar, wind and hydro installation to electrolyze water to produce hydrogen, which is then collected and transported offsite (e.g., by vehicle, rail, ship or pipeline) where it is typically burned or used in a fuel cell. As one example, U.S. Pat. No. 5,592,028 discloses a wind farm generation system that utilizes homopolar direct current ("DC") generators to electrolyze water into hydrogen and oxygen for transportation offsite. As another example, U.S. Pat. No. 4,910,963 discloses a solar energy collection system that produces electric current for powering an electrolysis unit and a cryogenic cooling unit which produces liquid hydrogen and oxygen. Specific to the hydroelectric field, U.S. Pat. No. 6,104,097 discloses a submersible hydro turbine designed for placement in river or ocean currents. The submersible hydro turbine includes a water tight bulb housing which contains everything necessary for the production of hydrogen gas including a turbine runner connected to an AC generator, an electrical converter that produces DC power from the AC power, and an electrolyzer which produces hydrogen and oxygen gas from the DC electrical power. The hydrogen is collected within the watertight housing and then piped to an on-shore storage tank for transportation offsite.

Although using hydrogen as a carrier of energy generated from solar, wind and hydro installations avoids the aforementioned constraints imposed by using a utility grid to carry the energy, it also may not be the most efficient use of the generated energy from an economic standpoint. As is well known, the prices of electrical energy continuously fluctuate due to changing demand levels, both due to seasonal variations and time of day restrictions. Similarly, the price of hydrogen is also impacted by changing demand levels and seasonal variations. As such, there are times when it may be more profitable to utilize the generated electrical energy to produce hydrogen on-site rather than to channel the power onto the utility grid, while at other times the reverse may be true.

In view of the foregoing, it can be seen there is a need for hydro power installations that are capable of large scale continuous hydrogen production. There is also a need for hydroelectric power installations that provide operators with information that facilitates intelligent decisions on operating the installation in an operating mode that maximizes revenue as market conditions change.

SUMMARY OF THE INVENTION

The present invention relates to high volume production of hydrogen from hydroelectric power. The invention further relates to a method and system for operating a hydroelectric turbine installation that is capable of operating in two or more different modes to provide the highest economic return.

An exemplary embodiment of the present invention relates to a method for operating a hydroelectric power generating facility configured for operating in first and second operating modes. The facility includes a turbine driven power generating unit receiving a flow of water through an upstream conduit to generate electrical power. The method comprises computing a first economic value for the generated electrical power when operating in the first operating mode, and computing a second economic value for the generated electrical power when operating in the second operating mode. The method further comprises comparing the first economic value with the second economic value to identify the operating mode that provides the higher economic value, and operating the turbine facility in the identified operating mode.

Another embodiment of the present invention relates to a hydroelectric turbine installation configured for operating in first and second operating modes. The installation includes a turbine driven power generating unit receiving a flow of water through an upstream conduit to generate electrical power. The turbine installation comprises means for computing a first economic value for the generated electrical power when operating in the first operating mode, and means for computing a second economic value for the generated electrical power when operating in the second operating mode. The turbine installation further comprises means for comparing the first economic value with the second economic value to identify the operating mode that provides the higher economic value, and means for operating the turbine facility in the identified operating mode.

Yet another embodiment of the present invention relates to a method for performing an economic comparison analysis in a hydroelectric power generating facility. The facility includes a turbine driven power generating unit receiving a flow of water through an upstream conduit to generate electrical power. The facility is capable of operating in a first operating mode wherein the generated electrical power is transported away from the facility using a first energy carrier. The facility is also capable of operating in a second operating mode wherein the generated electrical power is transported away from the facility using a second energy carrier. The method comprises computing a first economic value for the generated electrical power when the first energy carrier is used, and computing a second economic value for the generated electrical power when the second energy carrier is used. The method further comprises comparing the first economic value with the second economic value to identify the operating mode that provides the higher economic value, and operating the turbine facility in the identified operating mode.

These and other benefits and features of embodiments of the invention will be apparent upon consideration of the following detailed description of preferred embodiments thereof, presented in connection with the following drawings in which like reference numerals are used to identify like elements throughout.

Figure 1:
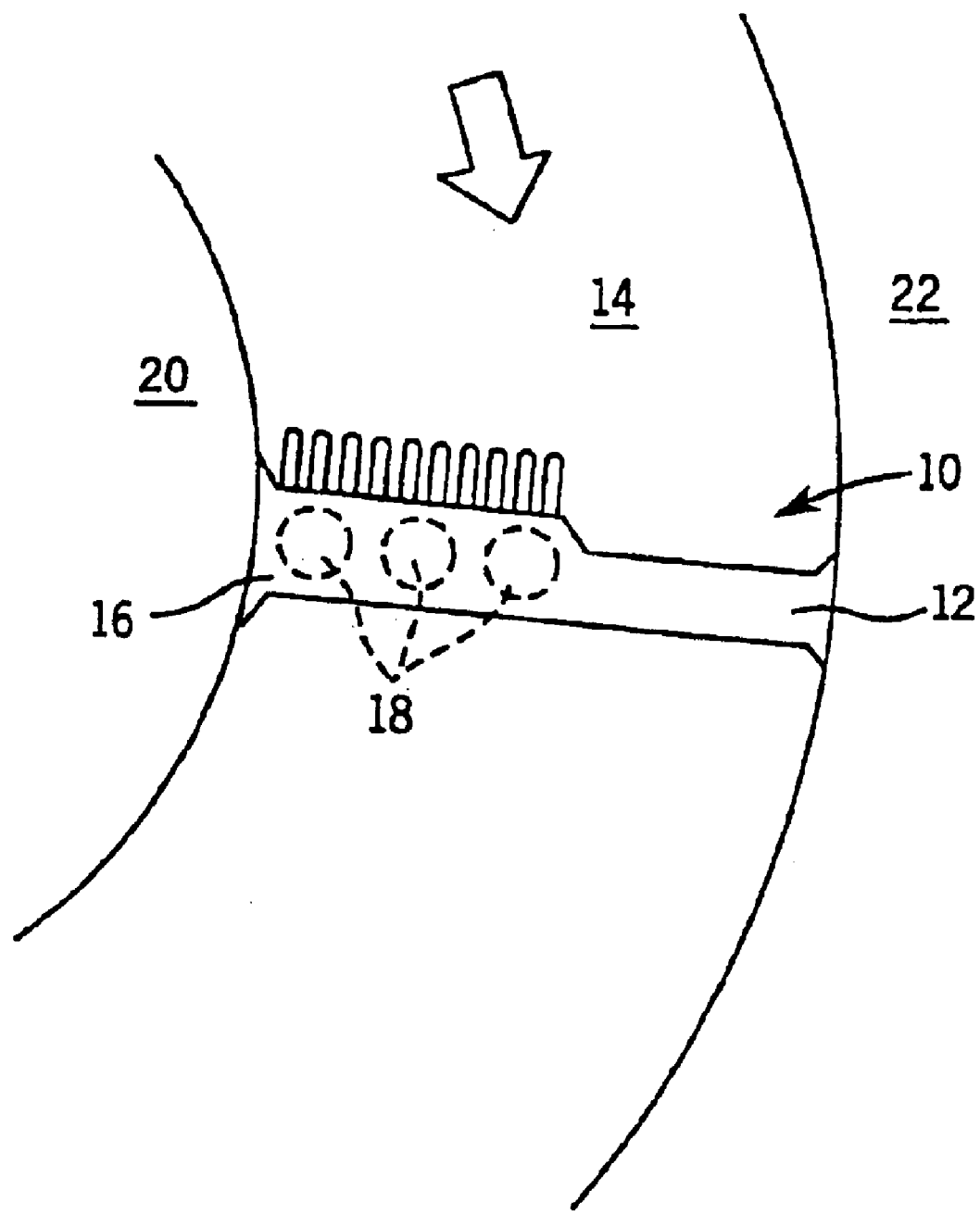
FIG. 1 is an exemplary top perspective view of a turbine power generating facility including several turbine units situated across a section of a river.

Before explaining several preferred embodiments of the present invention in detail it is noted that the invention is not limited to the details of construction or the arrangement of components set forth below or illustrated in the drawings. The invention is capable of other embodiments and being practiced or carried out in various ways. It is also noted that the phraseology and terminology employed herein is for purposes of description only and should not be regarded as limiting.

DETAILED DESCRIPTION OF THE PREFERRED EMBODIMENTS

Turning now to the drawings and referring to FIG. 1, a hydroelectric power generating installation 10 is illustrated generally, including a dam 12 spanning a river 14 and a power generating facility 16. In the illustrated embodiment, facility 16 includes a series of three turbine generating units, each designated generally by the reference numeral 18. As will be understood by persons skilled in the art, facility 16 may include more or fewer generating units 18, and such units may be situated adjacent to one or both banks 20, 22 of river 14, or at various locations between the banks. Moreover, while the following discussion makes reference to a Kaplan turbine by way of example, the present invention is not limited to application with any particular type of turbine unit. For example, other types of turbines that may be suitable for use in facility 16 besides Kaplan units include Francis, Pelton, Turgo, bulb, propeller, tubular, and cross-flow turbines.

Figure 2:
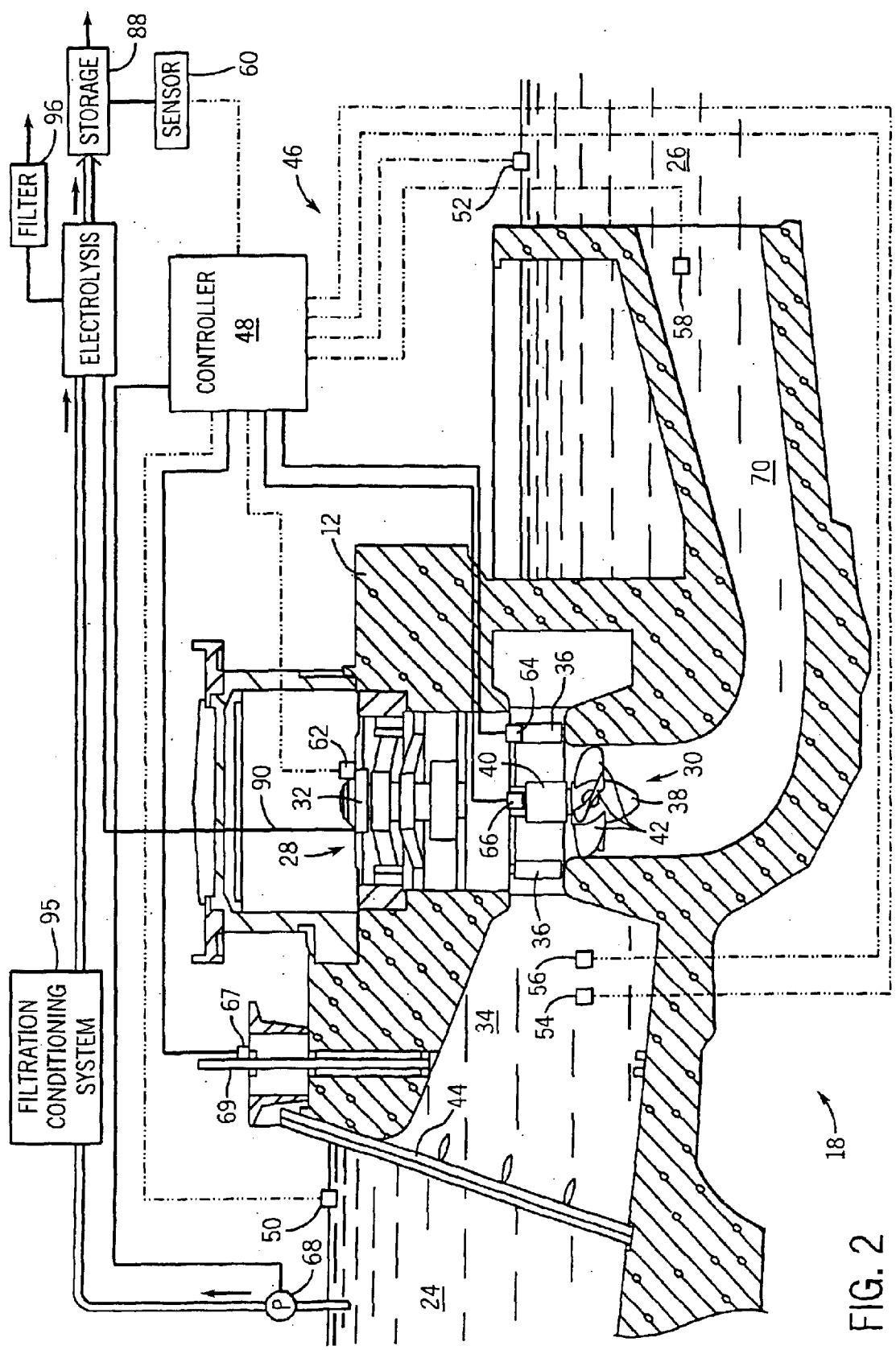
FIG. 2 is diagrammatic representation of a turbine installation illustrating exemplary instrumentation for monitoring and regulating the production of hydrogen and oxygen.

Each turbine unit 18 may be of generally known design—such as the vertical Kaplan turbine illustrated diagrammatically in FIG. 2—for generating electrical power as water is allowed to flow through dam 12 from a headwater reservoir 24 of river 14 to a tailwater side 26. Thus, unit 18 includes a turbine support superstructure 28 built within dam 12. Superstructure 28 provides axial and radial support for a turbine 30 and an associated electrical generator 32. In the illustrated power generating unit, turbine 30 is positioned within the flow path of river 14, downstream of an inlet conduit 34 and movable wicket gates 36. Turbine 30 includes a runner 38 supported on a vertical shaft 40 and having a plurality of movable blades 42 disposed around its periphery for driving shaft 40 and thus generator 32 in rotation as water flows through dam 12 from headwater 24 to tailwater 26. Unit 18 also includes a trash rack 44 upstream of inlet conduit 34, typically comprising parallel, spaced-apart bars, for preventing large objects and debris from fouling or damaging turbine 30. A mechanical cleaning system may be provided atop superstructure 28 for removing debris accumulated upstream of trash rack 44. Alternatively, facility 16 may employ manual methods (e.g., rakes) for removing debris from trash rack 44 when required.

In the preferred embodiment illustrated in FIG. 2, unit 18 includes a control system designated generally by the reference numeral 46. Control system 46 includes a plurality of sensors 50, 52, 54, 56, 58, 60 and 62, actuators 64, 66 and 67 and a water pump 68, all of which are coupled to a controller 48 by appropriate data links. For the purpose of controlling operation of unit 18 and monitoring the production of hydrogen, the sensors of control system 46 permit detection of a set of operating parameters. For example, the sensors may allow control system 46 to sense any or all of differential head from headwater 24 to tailwater 26, power generation level, flow through unit 18, cavitation, and the amount (or percent capacity) of hydrogen in a storage system 88 (as explained in detail below). Persons skilled in the art will understand that additional sensors could be employed to sense other operating parameters.

While various alternative methods are well known in the art for directly or indirectly measuring the foregoing parameters, preferred sensing devices include the following. Stilling well-type transducers 50 and 52 measure the relative elevation or height of headwater and tailwater 24 and 26, respectively. Such measurements are used to determine the drop in head (i.e., difference in elevation between the headwater and tailwater levels) across dam 12 and for determining the submersion factor (y) of the turbine as an indication of the risk of cavitation within turbine 30. The submersion level is generally determined as a function of the difference between the tailwater elevation and a reference elevation for turbine 30 in a manner well known in the art. Sensor 54 is a pressure transducer positioned at a suitable location within inlet conduit 34 for providing a signal proportional to head upstream of turbine 30, accounting for head losses between headwater 24 and gates 36. If unit 18 has a relatively short inlet conduit 34, sensor 54 may be situated near its entry. Reference numeral 56 represents a sensor assembly positioned within inlet conduit 34 for generating a signal indicative of flow through unit 18. In the preferred embodiment, flow is determined by the well known Winter-Kennedy method, although alternative methods could be substituted, including the Peck method. Sensor 58, provided in the draft tube 70 of unit 18, is a pressure transducer similar to sensor 54 generating a pressure measurement signal and isolating losses from turbine 30 to tailwater 26. Sensor 60 is one or more pressure transducers generating pressure measurements in storage system 88, which provides an indication of the amount (or percent capacity) of hydrogen in storage. Finally, reference numeral 62 represents a power monitor providing a continuous signal indicative of the level of power being generated by unit 18.

In addition to the sensors described above, control system 46 is typically provided with actuator assemblies 64, 66 and 67 for orienting gates 36, blades 42 and a water inlet shut-off device 69, respectively, at desired positions. Actuator assemblies 64, 66 and 67 may be of any suitable type known in the art, such as assemblies including hydraulic cylinders or motors coupled to mechanical linkages for effectuating the desired movement of the gates and blades and for holding the gates and blades in the desired positions against the force of impinging flow through unit 18. Moreover, actuator assemblies 64, 66 and 67 may also include sensors, such as potentiometers, linear variable differential transformers or the like, for providing feedback signals indicative of the actual positions of gates 36, blades 42 and shut-off device 69.

In the illustrated embodiment, shut-off device 69 comprises a vertically actuated drop down gate that may be lowered to close off water flow through inlet conduit 34 and raised to allow water flow. Alternatively, shut-off device 69 could comprise one or more of a butterfly valve, stop locks, a spherical valve or a lens valve, which shut-off devices would be especially advantageous for long penstock in high head installations. As another alternative, a ring gate could be installed closely surrounding the upstream edges of wicket gates 36 and arranged to drop down when necessary or desired to provide a positive water flow shut off in turbine 30. As persons skilled in the art will recognize, any or all of the foregoing shut-off devices could be used when overhauling or repairing turbine 30 as well as during start up and shut down of turbine 30.

Signals from the various sensors outlined above are applied to controller 48, which also serves to generate control signals for commanding actuator assemblies 64, 66 and 67 to position gates 36, blades 42 and valve 69 in desired orientations and for regulating the operation of water pump 68 (as described in detail below). In the presently preferred embodiment, controller 48 includes an appropriately configured programmable logic controller executing a cyclic control routine stored in resident memory (as also described in detail below). Moreover, controller 48 is preferably also linked to other turbine units 18 within facility 16. Thus, where the other units 18 within facility 16 are comparably instrumented, controller 48 receives signals indicative of the operating parameters of all units 18 in facility 16, and controls operation of all gates and blades in the various units.

In operation, facility 16 generates electrical power by permitting water to flow through turbine units 18, and outputs the generated power on an electrical line 90 to electrolysis equipment 92. According to one embodiment, generator 32 is an alternating current ("AC") generator. In this case, a suitable AC-to-DC power converter/filter (not shown) would be required to convert the AC power from generator 32 to the direct current ("DC") voltage needed for electrolyzer 92. According to a preferred embodiment, however, generator 32 is a DC generator. This eliminates the need for the power converter and thus potentially reduces the complexity and expense of turbine 18. As persons skilled in the art will appreciate, DC generators are generally classified according to the method used to provide field current for energizing the field magnets. Thus, a series-wound generator has its field in series with the armature, and a shunt-wound generator has the field connected in parallel with the armature. Compound-wound generators have part of their fields in series and part in parallel. Both shunt-wound and compound-wound generators have the advantage of delivering comparatively constant voltage under varying electrical loads. The series-wound generator is used principally to supply a constant current at variable voltage. Although any of the foregoing types of DC generators may be advantageously used in connection with the present invention, generator 32 is preferably of the compound wound type.

Regardless of the type and construction of generator 32, DC power is supplied to electrolyzer 92 (either directly from generator 32 or after passing through a power rectifier) to disassociate water into its constituent elements of hydrogen and oxygen. At its most basic level, electrolyzer 92 consists of two electrodes (an anode and a cathode) separated by an electrolyte in an aqueous solution (with a specified level of electrical conductivity). When DC power is applied across the two electrodes, the resulting voltage differential causes water molecules adjacent the anode to break down into oxygen, hydrogen ions and electrons. The hydrogen ions move through the electrolyte toward the cathode and combine with electrons that simultaneously move to the cathode through an external circuit. This results in the creation of hydrogen gas bubbles at the cathode and oxygen gas bubbles at the anode, and certain other by-products such as chlorine (produced at the anode) and metallic ions (produced at the cathode).

According to a preferred embodiment, electrolyzer 92 utilizes a liquid electrolyte. The liquid electrolyte is typically a strong acidic or basic solution (with a certain conductivity) such as sodium or potassium hydroxide. One possible construction of a liquid electrolyte based unit that may be suitable for use in the present invention is disclosed in U.S. Pat. No. 4,077,863, the entire contents of which are hereby incorporated by reference. With this electrolyzer, the electrolyte is hydrochloric acid in solution with water. Preferably, the water used for the electrolysis is filtered river water supplied by pump 68 via fluid line 94. The river water provided by pump 68 preferably passes through a filtration/ conditioning system 95 prior to electrolysis to provide the water with a specified level of clarity or cleanliness and/or electrical conductivity. As persons skilled in the art will appreciate, the electrolyzer disclosed in the foregoing patent includes a number of features that make it particularly well suited for use in the present invention. For example, the electrolyzer is capable of large scale continuous production of hydrogen due to its internal cooling devices for cooling the liquid electrolyte, a continuously changing filter mat for ensuring the electrolyte remains clean, and internal pumps for ensuring continuous circulation of the liquid electrolyte (which increases the effectiveness of the electrolysis).

As an alternative to using a liquid electrolyte, electrolyzer 92 may utilize a solid polymer electrolyte ("SPE"), which is sometimes referred to as a proton exchange membrane ("PEM"). As persons skilled in the art will understand, an SPE or PEM is an electronic insulator but an excellent conductor of hydrogen ions. The materials used to date include a fluorocarbon polymer backbone, similar to TEFLON®, to which are attached sulfonic acid groups. The acid molecules are fixed to the polymer and cannot "leak" out, which eliminates any concerns with electrolyte loss.

In addition to the two forgoing electrolyzer constructions, persons skilled in the art will understand that numerous other constructions for electrolyzers are known and could work equally well or perhaps even better for large scale hydrogen production in the present invention. Moreover, it will also be understood that more than one electrolyzer could be employed to further increase the hydrogen production capacity as needed.

Regardless of the particular type and construction of electrolyzer 92, when DC power is applied to the electrodes, water molecules will be broken down into their constituent elements of oxygen and hydrogen. The oxygen and hydrogen typically appear as gas bubbles at the anode and cathode, respectively, which bubbles are then collected and piped to storage system 88.

According to a preferred embodiment, storage system 88 includes associated sensor equipment 60 which provides a signal indicative of the amount (or percent capacity) of hydrogen contained in storage system 88. Sensor equipment 60 may also provide a signal indicative of the amount (or percent capacity) of oxygen contained in storage system 88.

According to a preferred embodiment, electrolyzer 92 preferably includes a filtration/conditioning/collection system 96. Filtration system 96 is desirable because the electrolysis process typically produces not only oxygen and hydrogen but also certain other by-products that may be desirable to filter out and/or collect. For example, if the electrolyte comprises a mixture of water and hydrochloric acid, one of the by-products of electrolysis will be chlorine gas. In this case, it is desirable to employ system 96 to collect the chlorine gas not only because of the environmental concerns with venting the chlorine into the surrounding air or river water, but also because the chlorine has inherent value that justifies the expense of capturing it. System 96 may also be capable of altering the conductivity of the electrolyte to a desired level.

Figure 3:
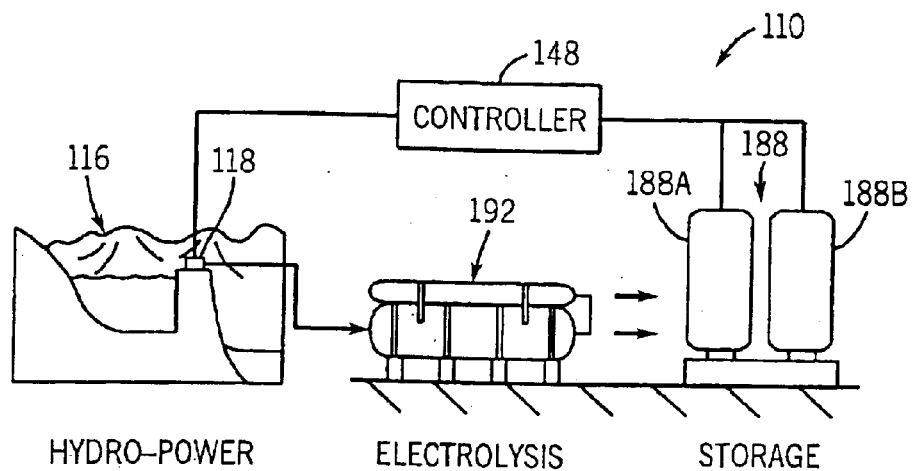
FIG. 3 is a schematic representation of a system for producing hydrogen and oxygen from hydro power.
Figure 4:
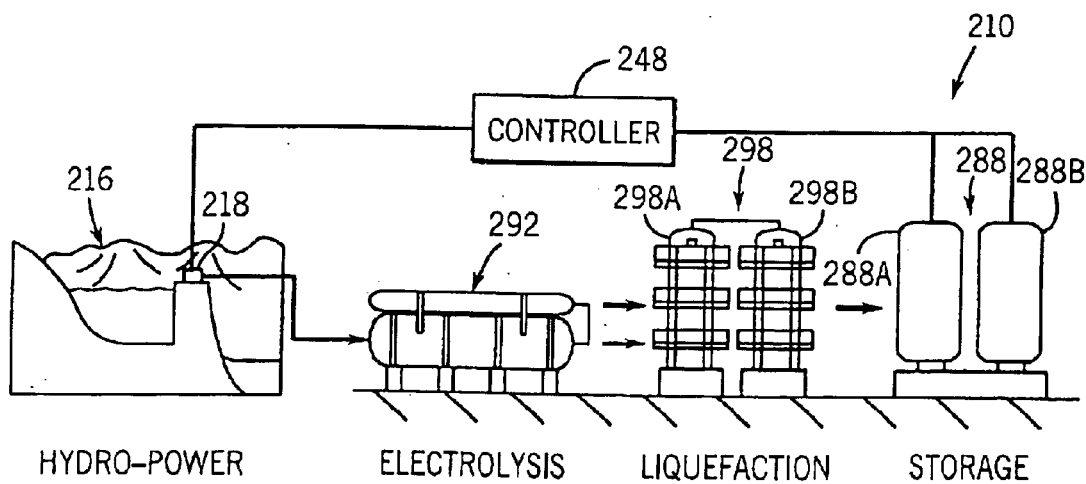
FIG. 4 is a schematic representation of an alternative system for producing hydrogen and oxygen from hydro power.

Turning now to FIGS. 3 and 4, two alternative embodiments of hydroelectric power generating installations 110 and 210 will be shown and described. For brevity, the descriptions of hydroelectric installations 110 and 210 will be generally limited to their differences relative to hydroelectric installation 10 described above. For convenience, elements of hydroelectric installations 110 and 210 that are substantially similar to corresponding elements of hydroelectric installation 10 will be identified by the same reference numerals but preceded by a "1" and "2", respectively.

In FIG. 3, hydroelectric power generating installation 110 comprises a hydro power facility 116 including an electrolyzer 192, a storage system 188, and a controller 148. As with hydro power facility 16, facility 116 includes one or more turbine generating units 118 which provide DC power to electrolyzer 192, which in turn provides hydrogen and oxygen gas to storage tanks 188A and 188B, respectively, via separate lines. Similarly, controller 148 monitors feedback signals from turbine generating unit 118 and storage system 188. Although not illustrated in FIG. 3, controller 148 may also monitor feedback signals from electrolyzer 192 (as explained further below). Based on these feedback signals, controller 148 adjusts the positions of the control surfaces (e.g., the gates and/or blades) of turbine generator 118 to regulate the power output and the operation of the water pump to supply filtered water to electrolyzer 192 as needed.

As persons skilled in the art will understand, storage tanks 188A and 188B may be high-pressure gas storage vessels, possibly including on-board compressors for pressurizing the hydrogen and oxygen gas as it enters the tanks. Alternatively, separate gas compressors could be used intermediate electrolyzer 192 and storage system 188. According to a preferred embodiment, however, storage tank 188A is a commercially available metal hydride storage vessel that stores the hydrogen in bonded form as a solid metal hydride. As is well known to those skilled in the art, certain metal hydride alloys such as magnesium-nickel, magnesium-copper iron-titanium compounds are able to reversibly absorb hydrogen via exothermic and endothermic chemical reactions. Thus, by removing or adding heat to storage tank 188A, it is possible to cause the metal hydride alloy to either absorb or release the hydrogen. When metal hydride storage is used, it may be desirable (or necessary) to clean the hydrogen prior to providing it to storage tank 188A to ensure the hydrogen is of sufficient quality that the metal hydride absorber is not damaged.

Turning now to FIG. 4, hydroelectric power generating installation 210 is substantially identical to installation 110 in most respects. For example, installation 210 comprises a hydro power facility 216 including one or more turbine generating units 218 for providing DC power to an electrolyzer 292, which is fluidly coupled to a storage system 288 including separate hydrogen and oxygen storage tanks 288A and 288B, respectively. Moreover, facility 216 includes a controller 248 coupled to receive feedback signals from, and provide control signals to, turbine generating units 218 and storage system 288.

Power generating installation 210 differs from installation 110 primarily in that it includes liquefaction equipment 298 situated between electrolyzer 292 and storage system 288. Liquefaction equipment 298 includes hydrogen and oxygen liquefaction tanks 298A and 298B, respectively.

It should be noted at this point that certain feedback/control data lines and power supply lines may be included in facility 216 but are not shown in FIG. 4 (or the preceding figures) to avoid obscuring the primary feedback loop structure evident in the figure, i.e., the feedback loop defined by generating unit 218 providing DC power to electrolyzer 292, which provides gaseous hydrogen and oxygen to liquefier 298, which provides liquid hydrogen and oxygen to storage tanks 288A and 288B, which provide feedback signals to controller 248, which uses the feedback signals to regulate the output of turbine generating unit 218. One example of a power line that preferably exists in facility 216 but is not shown in FIG. 4 is a line extending between turbine generating unit 218 and liquefier 298. This power line provides electrical power from turbine generating unit 218 to liquefier 298, which eliminates the need for any outside electrical power source (i.e., a power source external to facility 216). Another example of a power supply line that may exist in facility 216 but which is not illustrated in FIG. 4 is a line between generating unit 218 and storage system 288. Such a line would be advantageous whenever storage system 288 includes electrically powered equipment (e.g., on-board compressors, refrigeration units, etc.) to avoid the need for outside power. As yet another example, data lines may be provided between electrolyzer 292 and controller 248, and/or between liquefier 298 and controller 248. As persons skilled in the art will understand, such lines would allow controller 248 to monitor and control the equipment illustrated in FIG. 2 and any of their on-board components.

Figure 5:
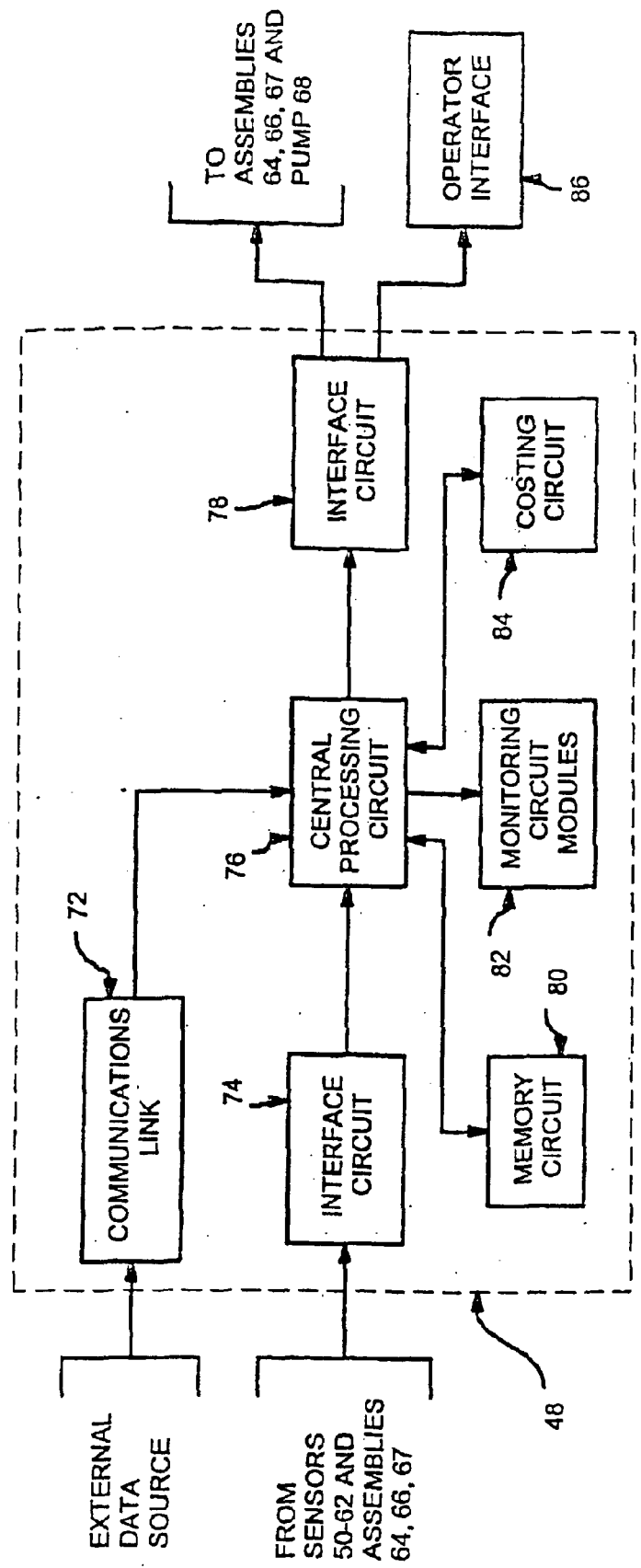
FIG. 5 is a block diagram of certain functional circuits in a control system such as illustrated in any of FIGS. 2–4 for monitoring and regulating the production of hydrogen and for determining an economically preferred mode of operation.

With reference now to FIG. 5, a general block diagram of certain functional circuits optionally included in controller 48 (or controllers 148 and/or 248) when programmed to execute an economic comparison analysis will be described. In the illustrated embodiment, controller 48 includes a communications link 72, an interface circuit 74, a central processing circuit 76, an interface circuit 78, a memory circuit 80, a monitoring circuit 82, and a costing circuit 84.

Communications link 72 preferably includes a fiber optic-based wide area network, but may instead include a high speed modem or other telecommunications device. Regardless of its form, communications link 72 (when present) provides central processing circuit 76 with data from an external data source, such as an on-line source of up-to-date electrical energy and hydrogen prices, for use in an economic comparison analysis described below.

Interface circuit 74, which typically includes appropriate multiplexing, analog-to-digital converting and signal conditioning circuitry, receives operating parameter signals from sensors 50–62 and feedback signals from actuator assemblies 64, 66 and 67, and applies these signals to central processing circuit 76. Similarly, interface circuit 78, which typically includes appropriate signal conditioning circuitry, receives control signals from central processing circuit 76 and commands corresponding servo movement of equipment within facility 16, such as actuator assemblies 64, 66 and 67 (for controlling orientation of gates 36, blades 42 and shut-off valve 69, respectively) and water pump 68 (for feeding filtered river water into electrolyzer 92). Although not illustrated in the figures, interface circuits 74 and/or 78 may also be coupled to filtration systems 95 and/or 96 to allow central processing circuit 76 to receive various sensor or feedback signals from systems 95 and/or 96 and to send command signals thereto.

According to a preferred embodiment, interface circuit 78 communicates control signals from central processing circuit 76 to an operator interface 86 for displaying operating conditions, such as the real-time power output from generator 32, the present rate of hydrogen production (if facility 16 is presently operating in a hydrogen producing mode as described below) and the amount (or percent capacity) of hydrogen in storage. Operator interface 86, which typically includes a computer monitor situated in a control station (not shown) for facility 16, may also display or sound visual or audible alarms, such as when hydrogen storage capacity limits are approached or the rate of hydrogen production drops unexpectedly.

For reasons explained in detail below, central processing circuit 76 is also linked to memory circuit 80, hydrogen monitoring circuit 82, and costing circuit 84. In operation, central processing circuit 76 executes a cyclical control routine stored within memory circuit 80 for controlling operation of facility 16.

As will be appreciated by those skilled in the art, the functional circuitry represented in FIG. 5 may be defined by standard input/output circuitry, memory circuitry and programming code in a standard programmable logic controller, personal computer, computer workstation or the like. For example, in the presently preferred embodiment, central processing circuit 76, in the form of a programmable logic controller dedicated to facility 16, is provided with resident memory for executing a main control routine. Monitoring circuit 82 and costing circuit 84 are preferably portions of the main control routine, or may comprise separate software modules retrofitted to the main control routine.

Application of the present embodiment to perform an economic comparison analysis to determine the best economic use of the electrical power generated by turbine generator unit 18 will now be described. In accordance with a preferred embodiment, controller 48 performs this comparison analysis as follows. First, hydrogen monitoring circuit 82 receives signals from hydrogen storage sensor 60 and determines how much capacity (e.g., the number of cubic liters) storage system 88 has for storing additional hydrogen (or for storing additional oxygen or another commercially valuable by-product of the −15 electrolysis process that is being collected such as chlorine). Based on this information, costing circuit 84 estimates the amount of electrical power (e.g., the number of kilowatts) that would be required to produce the amount of hydrogen (or oxygen or other by-product being collected) necessary to achieve full capacity. The amount of electrical power required to fill storage system 88 to capacity may be based on historical data contained in memory circuit 80 as described below.

The resulting information provides controller 48 (and hence plant personnel) with an indication of how much revenue could be generated if the electrical power produced by generator 32 were used to electrolyze water into its constituent elements (e.g., hydrogen, oxygen and any other commercially valuable by-products of the electrolysis) rather than placed on the utility grid. As persons skilled in the art will appreciate, electrolyzer 92 requires DC power, while the utility grid requires synchronized AC power. As a result, an inverter may be required to produce the AC power for the utility grid if generator 32 is a DC generator. Similarly, a rectifier may be required to produce DC power for electrolyzer 92 if generator 32 is an AC generator.

By comparing the economic value of the hydrogen, oxygen and any other commercially significant by-products to the value of providing the electrical power on the utility grid, controller 48 is able to determine whether it is preferable (from an economic standpoint) to operate one or more turbines 18 of facility 16 in a hydrogen producing mode rather than a utility grid-supplying mode, or vice versa. According to a preferred embodiment, controller 48 is also capable of determining when a combination of the two modes is most advantageous from a revenue maximizing standpoint. This situation may exist, for example, when an economic comparison shows that the value of the generated electrical power is greater when placed on the grid than when used to produce hydrogen, but there is sufficiently low demand on the grid that facility 16 has excess capacity to generate electrical energy that cannot be placed on the grid. In this situation, controller 48 can elect to "use up" the excess electrical generating capacity by using the energy for electrolysis.

According to a preferred embodiment, the economic value of the electrical power is based on a unitized energy value which may be assumed from past performance (e.g., it may be an average of the past several months of values) and stored in memory circuit 80, or it may be accessed from an on-line source (e.g., a utility) through communications link 72. Similarly, the economic value of the hydrogen, oxygen and any other commercially significant by-products is based on a unitized market value that may be assumed from past performance, or, alternatively, accessed from an on-line source through link 72. Where the unitized values are based on averaged past performance values, such averaged values will necessarily reflect any changes in electrical energy or hydrogen prices resulting from changing demand due to seasonal variations and other factors.

In a preferred embodiment, costing circuit 84 takes into account not only the unitized energy value of the electrical energy but it also estimates the decreases in operating efficiency that may result from the constraints inherent from operating the turbine at a synchronized speed when connected to the grid (as opposed to there being no such constraints when operating in a hydrogen producing mode). Since persons skilled in the art will know how to estimate such performance losses, however, the specific details of these adjustments need not be discussed herein.

According to the preferred embodiment, when facility 16 is in the hydrogen producing mode, controller 48 continuously monitors the rate of hydrogen production and the amount of electrical energy used to produce the hydrogen, and stores this information in memory circuit 80. As a result of this storage operation, this information is available the next time an economic comparison analysis is performed, which improves accuracy over time.

It is important to note that the above-described preferred and alternative embodiments of the hydroelectric power generating installation are illustrative only. Although the invention has been described in conjunction with specific embodiments thereof, those skilled in the art will appreciate that numerous modifications are possible without materially departing from the novel teachings and advantages of the subject matter described herein. For example, the above-described hydrogen and oxygen storage systems could be used in combination with, or replaced by, a pipeline distribution system that extends from the turbine installation to another location at which the products may be transported further or directly used. Accordingly, these and all other such modifications are intended to be included within the scope of the present invention. Other substitutions, modifications, changes and omissions may be made in the design, operating conditions and arrangement of the preferred and other exemplary embodiments without departing from the spirit of the present invention.

What is claimed is:

1. A method for operating a hydroelectric power generating facility configured for operating in first and second operating modes, the facility including a turbine driven power generating unit receiving a flow of water through an upstream conduit to generate electrical power, the method comprising:
   computing a first economic value for the generated electrical power when operating in the first operating mode;
   computing a second economic value for the generated electrical power when operating in the second operating mode;
   comparing the first economic value with the second economic value to identify the operating mode that provides the higher economic value; and
   operating the turbine facility in the identified operating mode.

2. The method of claim 1, wherein the facility includes hydrogen producing equipment and the first operating mode involves producing hydrogen from the generated electrical power.

3. The method of claim 2, wherein the first operating mode further includes transporting the hydrogen away from the facility using a hydrogen distribution system.

4. The method of claim 3, wherein the hydrogen distribution system is a gas or liquid pipeline.

5. The method of claim 2, wherein the facility is connected to a utility grid and the second operating mode involves supplying the generated electrical power to the utility grid.

6. The method of claim 2, wherein the generated electrical power is DC power and the hydrogen producing equipment includes an electrolyzer.

7. The method of claim 2, wherein the generated electrical power is AC power and the method further includes converting the AC power to DC power when operating in the first operating mode.

8. The method of claim 2, further including storing the hydrogen in a hydrogen storage vessel.

9. The method of claim 2, further including capturing at least one byproduct of the hydrogen production process during the first operating mode.

10. The method of claim 2, further including filtering the hydrogen produced during the first operating mode to remove impurities.

11. The method of claim 1, wherein the first operating mode utilizes hydrogen to transport the generated electrical energy away from the facility and the second operating mode utilizes a utility grid.

12. The method of claim 1, wherein at least one of the first and second economic values is based on a unitized energy value derived from past performance.

13. The method of claim 1, wherein at least one of the first and second economic values is based on a unitized energy value obtained from a remote source via a communications link.

14. A hydroelectric turbine installation configured for operating in first and second operating modes, the installation including a turbine driven power generating unit receiving a flow of water through an upstream conduit to generate electrical power, the turbine installation comprising:
   means for computing a first economic value for the generated electrical power when operating in the first operating mode;
   means for computing a second economic value for the generated electrical power when operating in the second operating mode;
   means for comparing the first economic value with the second economic value to identify the operating mode that provides the higher economic value; and
   means for operating the turbine facility in the identified operating mode.

15. The turbine installation of claim 14, wherein the turbine installation includes means for producing hydrogen and the first operating mode involves producing hydrogen from the generated electrical power.

16. The turbine installation of claim 15, further including means for transporting the hydrogen away from the facility.

17. The turbine installation of claim 16, wherein the means for transporting the hydrogen includes a gas or liquid pipeline.

18. The turbine installation of claim 15, wherein the facility is connected to a utility grid and the second operating mode involves supplying the generated electrical power to the utility grid.

19. The turbine installation of claim 15, wherein the generated electrical power is DC power and the means for producing hydrogen includes an electrolyzer.

20. The turbine installation of claim 15, wherein the generated electrical power is AC power and the turbine installation further includes means for converting the AC power to DC power when operating in the first operating mode.

21. The turbine installation of claim 15, further including means for storing the hydrogen.

22. The turbine installation of claim 15, further including means for capturing at least one byproduct of the hydrogen production process during the first operating mode.

23. The turbine installation of claim 15, further including means for filtering the hydrogen produced during the first operating mode to remove impurities.

24. The turbine installation of claim 14, wherein at least one of the first and second economic values is based on a unitized energy value derived from past performance.

25. The turbine installation of claim 14, wherein at least one of the first and second economic values is based on a unitized energy value obtained from a remote source via a communications link.

26. A method for performing an economic comparison analysis in a hydroelectric power generating facility, the facility including a turbine driven power generating unit receiving a flow of water through an upstream conduit to generate electrical power, the facility capable of operating in a first operating mode wherein the generated electrical power is transported away from the facility using a first energy carrier and a second operating mode wherein the generated electrical power is transported away from the facility using a second energy carrier, the method comprising:

computing a first economic value for the generated electrical power when the first energy carrier is used;

computing a second economic value for the generated electrical power when the second energy carrier is used;

comparing the first economic value with the second economic value to identify the operating mode that provides the higher economic value; and operating the turbine facility in the identified operating mode.

27. The method of claim 26, wherein the facility includes hydrogen producing equipment and the first operating mode involves producing hydrogen from the generated electrical power.

28. The method of claim 27, wherein the first operating mode further includes transporting the hydrogen away from the facility using a hydrogen distribution system.

29. The method of claim 28, wherein the hydrogen distribution system is a gas or liquid pipeline.

30. The method of claim 27, wherein the facility is connected to a utility grid and the second operating mode involves supplying the generated electrical power to the utility grid.

31. The method of claim 27, wherein the generated electrical power is DC power and the hydrogen producing equipment includes an electrolyzer.

32. The method of claim 27, wherein the generated electrical power is AC power and the method further includes converting the AC power to DC power when operating in the first operating mode.

33. The method of claim 27, further including storing the hydrogen in a hydrogen storage vessel.

34. The method of claim 27, further including capturing at least one byproduct of the hydrogen production process during the first operating mode.

35. The method of claim 27, further including filtering the hydrogen produced during the first operating mode to remove impurities.

36. The method of claim 26, wherein the first energy carrier is hydrogen and the second energy carrier is a utility grid.

37. The method of claim 26, wherein at least one of the first and second economic values is based on a unitized energy value derived from past performance.

38. The method of claim 26, wherein at least one of the first and second economic values is based on a unitized energy value obtained from a remote source via a communications link.

* * * * *